(12) United States Patent
Kosel

(10) Patent No.: US 12,006,989 B1
(45) Date of Patent: Jun. 11, 2024

(54) PROPELLER LOCKING MECHANISM

(71) Applicant: Pipistrel d.o.o., Ajdovščina (SI)

(72) Inventor: Tadej Kosel, Komenda (SI)

(73) Assignee: Pipistrel d.o.o., Ajdovščina (SI)

( * ) Notice: Subject to any disclaimer, the term of this patent is extended or adjusted under 35 U.S.C. 154(b) by 0 days.

(21) Appl. No.: 18/531,624

(22) Filed: Dec. 6, 2023

(51) Int. Cl.
*F16D 63/00* (2006.01)
*B64C 27/32* (2006.01)
*B64C 29/00* (2006.01)

(52) U.S. Cl.
CPC .......... *F16D 63/006* (2013.01); *B64C 27/322* (2013.01); *B64C 29/0025* (2013.01)

(58) Field of Classification Search
CPC .. F16D 63/006; B64C 27/322; B64C 29/0025
See application file for complete search history.

(56) References Cited

U.S. PATENT DOCUMENTS

| | | | |
|---|---|---|---|
| 7,462,015 B2 * | 12/2008 | Mazet | B64C 27/322 416/53 |
| 9,783,288 B1 * | 10/2017 | Moore | H01F 7/0226 |
| 10,293,927 B1 | 5/2019 | Horn et al. | |
| 10,336,443 B2 * | 7/2019 | Louis | B64C 27/30 |
| 10,364,022 B2 * | 7/2019 | Bond | B64C 25/30 |
| 10,618,656 B2 | 4/2020 | Campbell | |
| 10,946,955 B2 * | 3/2021 | Schank | B64C 27/322 |
| 10,994,837 B1 * | 5/2021 | Cravener | B64C 11/325 |
| 11,008,094 B2 * | 5/2021 | Cravener | B64C 27/322 |
| 11,052,993 B2 | 7/2021 | Cravener et al. | |
| 11,511,848 B2 * | 11/2022 | Cravener | B64C 11/06 |
| 11,532,969 B2 * | 12/2022 | Norton | H02K 7/10 |
| 11,603,194 B2 | 3/2023 | Mccullough et al. | |
| 2017/0144746 A1 | 5/2017 | Schank et al. | |
| 2018/0002013 A1 | 1/2018 | Mccullough et al. | |
| 2022/0315203 A1 * | 10/2022 | Eche | B64U 50/19 |

* cited by examiner

*Primary Examiner* — Jesse S Bogue
(74) *Attorney, Agent, or Firm* — Avek IP, LLC

(57) ABSTRACT

A propeller locking mechanism for an aircraft includes a mounting ring having a locking extension with an aperture. A solenoid is configured with a solenoid pin which interacts with a first arm of a lever. The lever includes a pivotable second arm configured with a spring and locking pin. The second arm is able to pivot and insert the locking pin into the aperture of the locking extension on the mounting ring. The spring biases the locking pin in the locked orientation. Upon sufficient motor torque, the spring force is overcome allowing the locking pin to be removed from the aperture and the mounting ring to be unlocked.

15 Claims, 10 Drawing Sheets

PROPELLER LOCKING MECHANISM

BACKGROUND OF THE INVENTION

1. Field

The disclosed embodiments relate generally to the field of aircraft propellers. More specifically, the disclosed embodiments relate to aircraft propeller locking mechanisms.

2. Description of the Related Art

It is known for an aircraft propeller to calculate a brake stop point in order to have the propeller stop in a certain orientation. For example, in U.S. Pat. No. 10,293,927 to Horn et al. discloses a stoppable rotor that may be stopped by a pilot when desired in flight. The point at which the propeller stops may be calculated.

It is also known for an aircraft to have a spring loaded link to be used in a locking mechanism. For example, in U.S. Pat. No. 11,052,993 to Cravener et al. discloses propeller blades used to provide vertical lift which are folded and locked during forward motion. The locking mechanism includes a fold lock and a pitch lock which consist of arms rotatably coupled to elements with pin type connectors.

A vertical takeoff and landing aircraft is also known to have propellers that provide vertical lift and may be folded and locked during forward motion. For example, in U.S. Patent Application Publication No. 2017/0144746 to Schank et al. discloses a gimbal lock positioned on a mast. The blade lock assembly includes a fold lock and a pitch lock which consist of arms rotatably coupled to elements with pin type connectors.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a propeller locking mechanism for an aircraft, the propeller locking mechanism including: a mounting ring having a locking extension, wherein the mounting ring is configured for mounting to an aircraft motor rotor; a solenoid mount mechanically coupled to an aircraft, wherein the solenoid mount includes a solenoid and a lever operatively coupled to the solenoid, such that the solenoid is configured to pivot the lever within the solenoid mount; a locking pin pivotally coupled to a first arm of the lever, wherein the locking pin is configured for insertion into an aperture of the locking extension for locking the mounting ring; and the solenoid is configured to pivot the lever in a first direction for removal of the locking pin from the aperture for unlocking the mounting ring.

In some embodiments, the techniques described herein relate to a method for a propeller locking mechanism for an aircraft, the method including: engaging a locking pin in an aperture of a mounting ring for securing the locking pin to the mounting ring, wherein the mounting ring is mounted to a propeller hub and the locking pin is pivotally coupled to an aircraft via a lever; actuating the lever via a solenoid for retrieving the locking pin from the aperture thereby unlocking the mounting ring; biasing the locking pin with a spring such that upon release of the lever via the solenoid, the spring biases the locking pin into the aperture.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
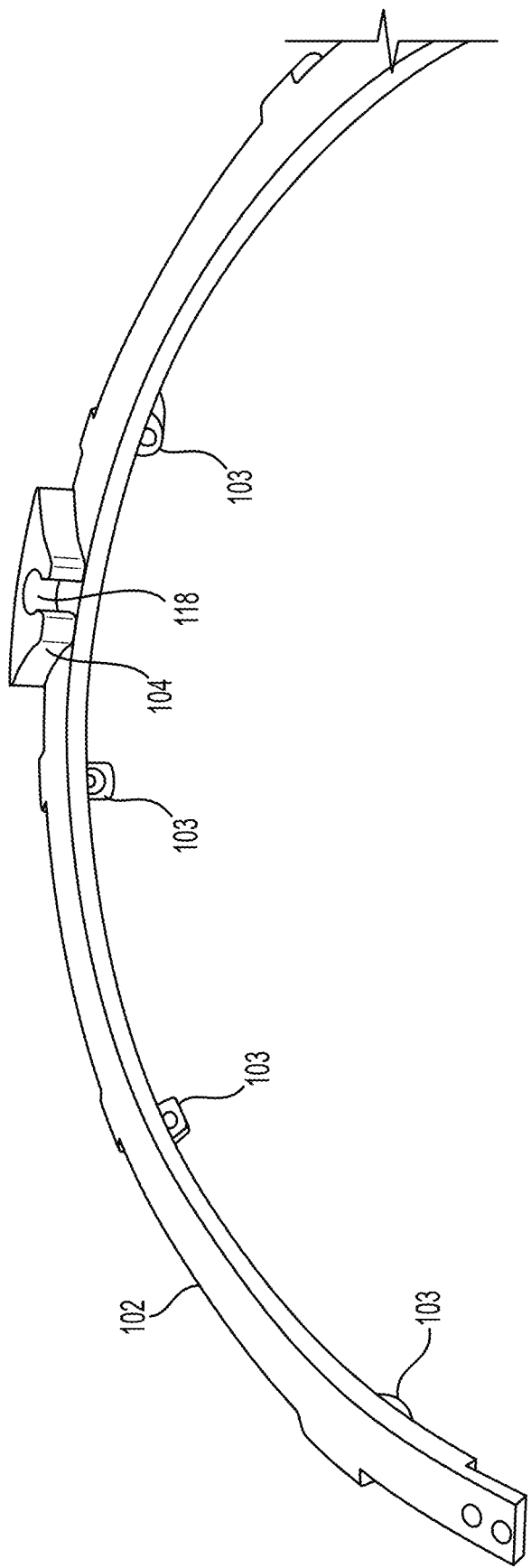
FIG. 1 is a perspective view of the mounting ring for a propeller locking mechanism, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a system for locking an aircraft propeller in place. It is advantageous for an aircraft propeller to become locked in a specified orientation during flight to prevent the propeller from windmilling and possibly increasing drag on the aircraft. Current arrangements to lock a propeller into place may be worn down by friction of a rotating propeller on locking components, and other current arrangements require a propeller to be folded and locked into place using fold locks, pitch locks, and gimbal locks.

Embodiments herein provide a system and method for locking an aircraft propeller in place during flight. The propeller locking mechanism is able to withstand lateral forces present during flight and substantially lock the propeller in a position and prevent the propeller from windmilling. For the locking mechanism to become engaged, precise positioning of the propeller may be required. A desired locking position for the propeller may be such that the propeller is in line with a boom of the aircraft, for example. The locking mechanism includes a solenoid and locking pin that are configured to lock the propeller in place. The solenoid is configured to move the locking pin between locked and unlocked positions for locking the propeller. The propeller mechanism may be overcome by torque from the propeller motor if the locking mechanism fails to unlock. The locking mechanism is configured to be unlocked via propeller torque without inducing damage to the components of the locking mechanism ensuring that the locking mechanism can be reused. The locking mechanism may be biased into the locked position such that the solenoid is not required to be supplied with electrical power for the maintaining the locking mechanism in the locked position. In other words, energy is not needed to maintain the locked propeller position during flight.

Figure 9:
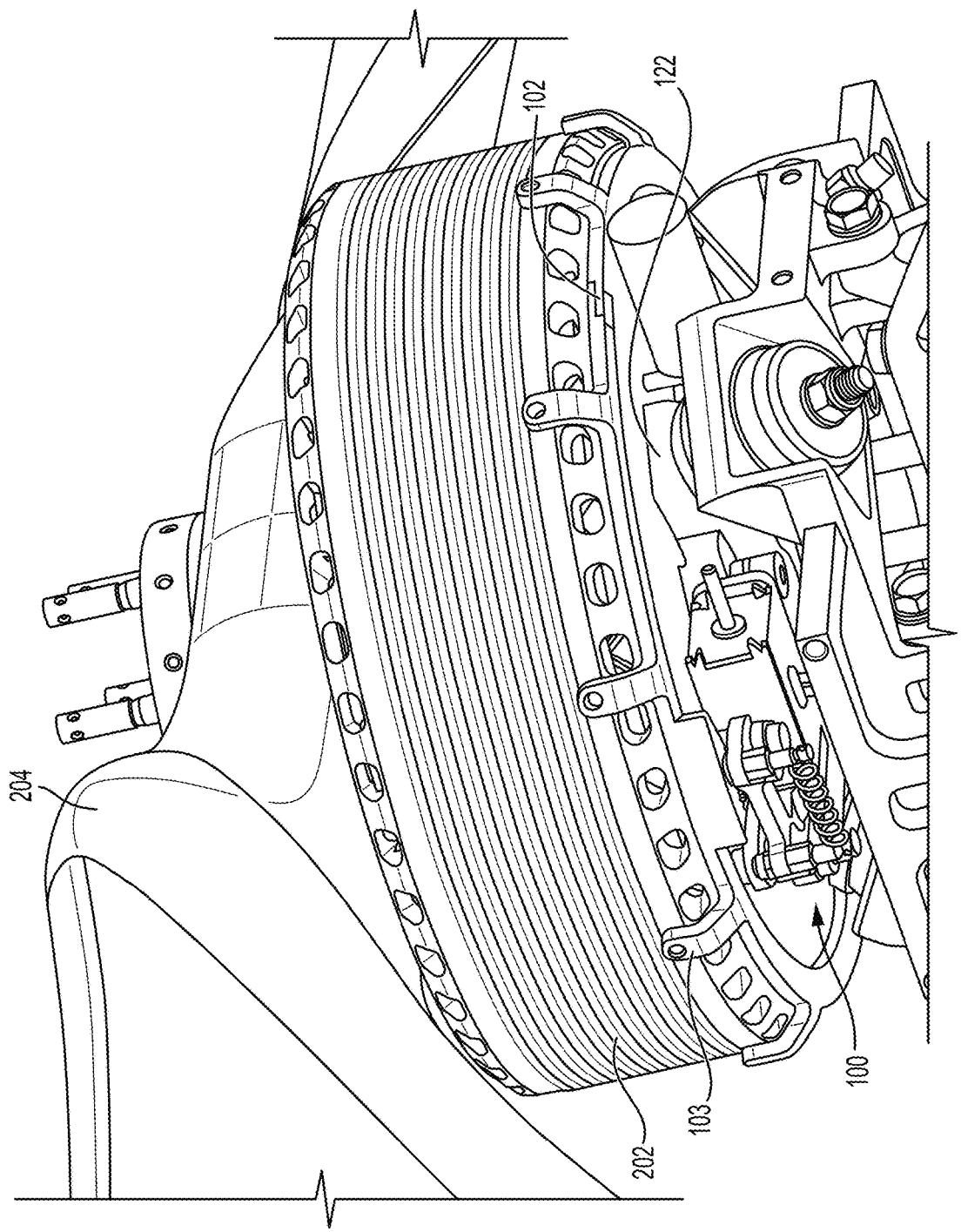
FIG. 9 is a perspective view of the propeller locking mechanism mounted to an aircraft hub and propeller.

FIG. 1 shows a perspective view of a mounting ring 102. A locking extension 104 is mounted onto a first side (e.g., a top side as depicted in FIG. 1) of the mounting ring 102. The mounting ring 102 has a substantially circular geometry and is formed from two equal halves with each half roughly sized to slide over a propeller motor holder 122 (see FIG. 9). The mounting ring 102 has bolt mounts 103 mounted to a second side (e.g., a bottom surface as depicted in FIG. 1) of the mounting ring 102, with each bolt mount 103. The bolt mounts 103 are configured to receive a bolt or other fastener for securing the mounting ring 102 to an aircraft (e.g., to the rear side of the motor rotor as shown in FIG. 9). Shown in FIG. 1, in an embodiment, four bolt mounts 103 are mounted to the mounting ring 102 however; in other embodiments, any number of bolt mounts 103 may exist and may be spaced any distance away from one another. The locking extension 104 is mounted at a position on the mounting ring 102 such that when a pin aligns and inserts within the locking extension 104, the propeller will be locked into place. The position of the locking extension 104 on the mounting ring 102 may be chosen based upon a desired propeller lock position. One possible desired propeller lock position is such that the propeller aligns with a boom of the aircraft.

Figure 2:
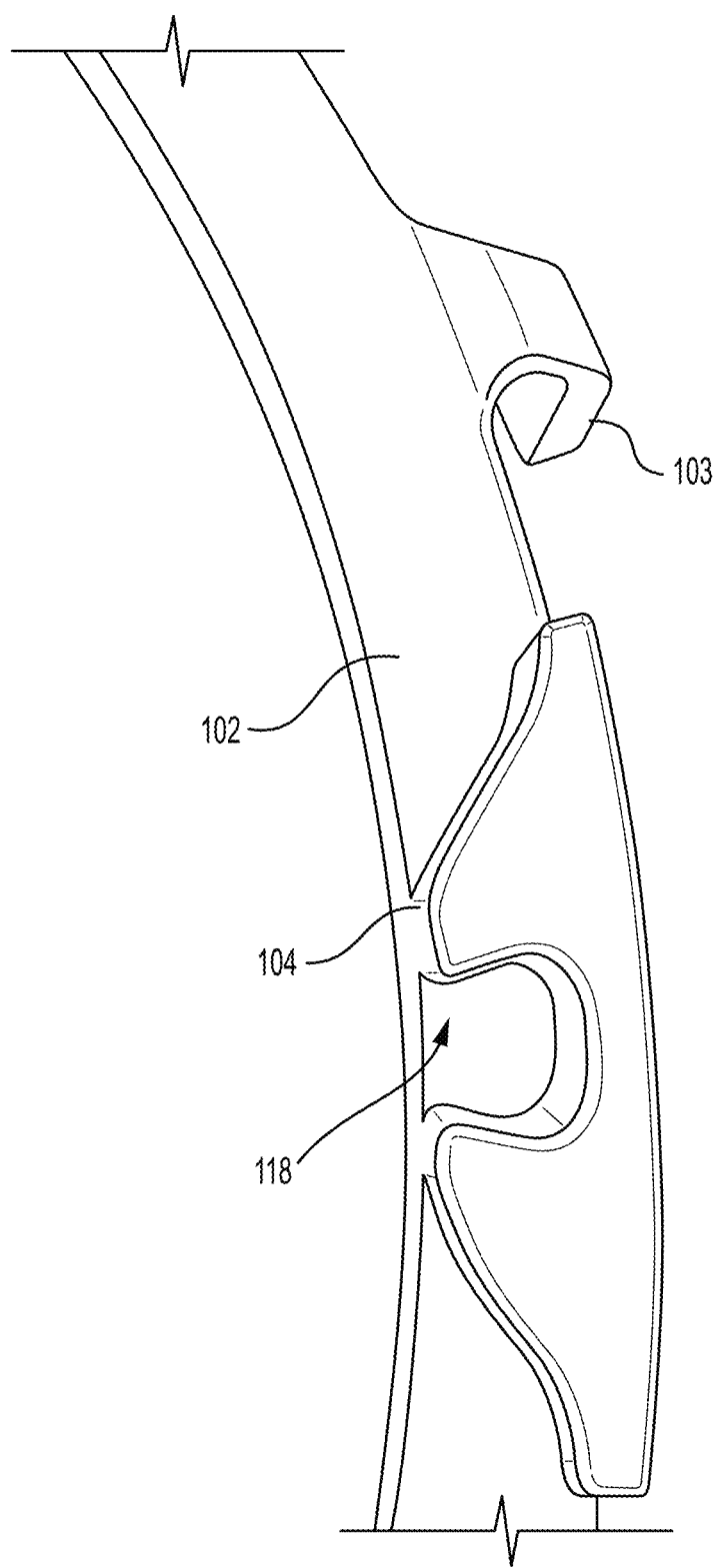
FIG. 2 is a close-up top view of the mounting ring of FIG. 1 showing a locking extension, in an embodiment.

FIG. 2 shows the locking extension 104 mounted on the first side of the mounting ring 102. The locking extension 104 has curvature along its outer edge which substantially conforms to the outer edge of the mounting ring 102. On its inner edge, the locking extension 104 includes an aperture 118 substantially near its center. The aperture 118 is horseshoe shaped with the open end of the horseshoe directionally facing the inside of the mounting ring 102. From the horseshoe opening of the aperture 118, the locking extension 104 bottom edge is contoured with curvature which gradually slopes from the inner edge adjacent the aperture 118 towards the outer edge on opposite ends of the locking extension 104. The aperture 118 allows for a pin to slide into the locking extension 104 so that the propeller locking mechanism 100 may become engaged and lock the propeller in position.

Figure 3:
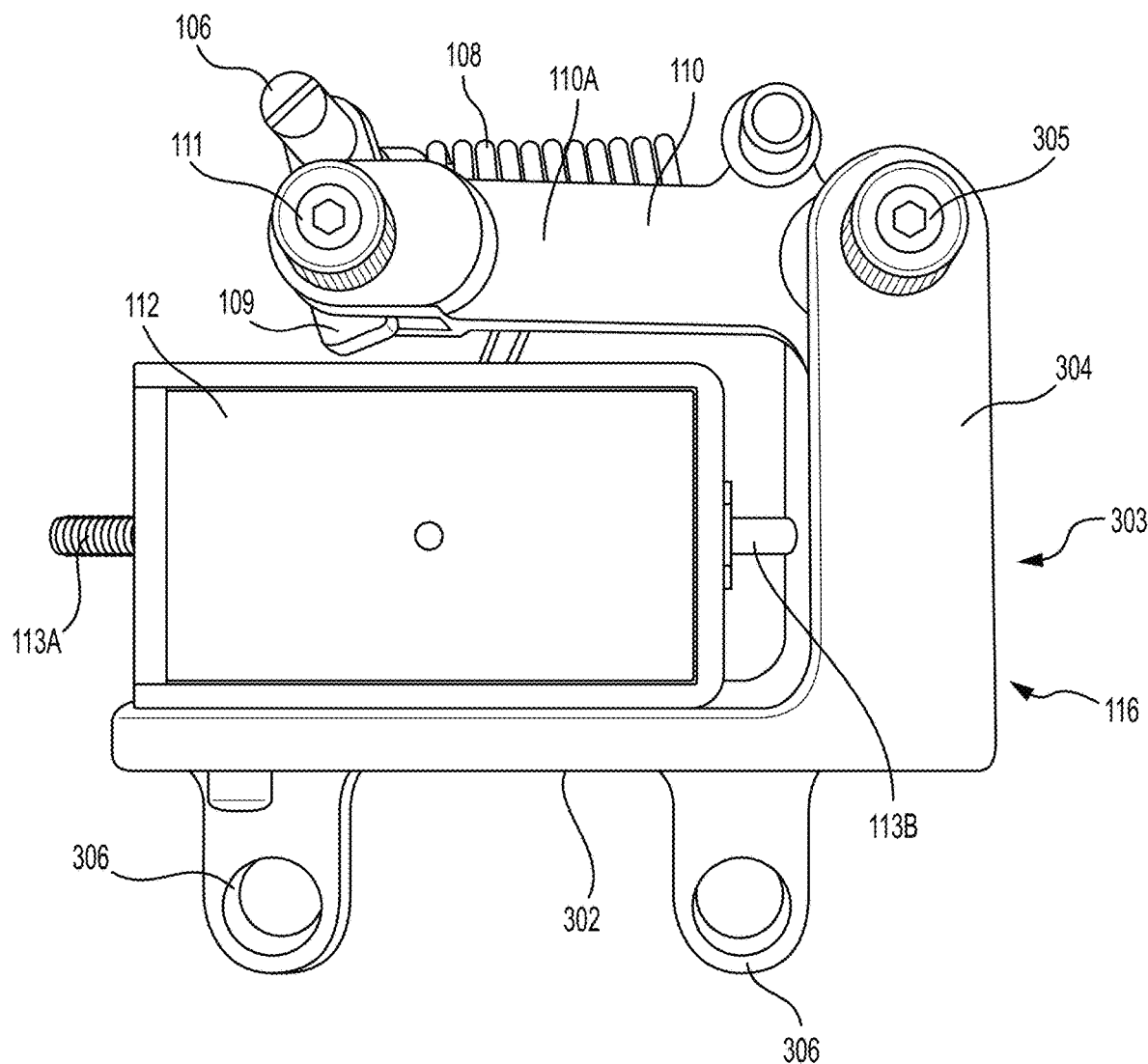
FIG. 3 shows a solenoid mount for the propeller locking mechanism, in an embodiment.

FIG. 3 shows a solenoid mount 116 of the propeller locking mechanism 100. A solenoid 112 is mounted and secured to a base portion 302 of the solenoid mount 116. The solenoid 112 includes a solenoid pin 113 which is shown to extend on either side of the solenoid 112. The solenoid pin 113 is threaded on a first end 113A and may be rotated so that a desired distance of the solenoid pin 113 protrudes from the solenoid 112. As the threaded first end of the solenoid pin 113A is rotated to go further into the solenoid 112, a second end 113B of the solenoid pin 113 will protrude a greater distance on the opposite end of the solenoid 112. If the threaded first end of the solenoid pin 113A is rotated to spin further out of the solenoid 112, the second end 113B of the solenoid pin 113 will protrude a lesser distance on the opposite end of the solenoid 112. The solenoid 112 includes an internal magnet or magnets (not shown) designed to interact with the solenoid pin 113 and substantially hold the solenoid pin 113 in place with either the first end 113A or the second end 113B protruding from the solenoid 112.

A bolt extension mount 304 extends perpendicularly away from one end of the base portion 302. The base portion 302 and bolt extension mount 304 are configured to form an "L" shape. The base portion 302 includes two aperture extensions 306 which extend downwards from the exterior face of the base portion 302. The two aperture extensions 306 may be used to insert a bolt or threaded element to secure the solenoid mount 116 to an aircraft. In embodiments, the solenoid mount 116 is mounted to the propeller motor holder 122 (FIG. 9) which is a piece screwed directly onto the motor. Other fastening arrangements may be employed without departing from the scope hereof.

Figure 4:
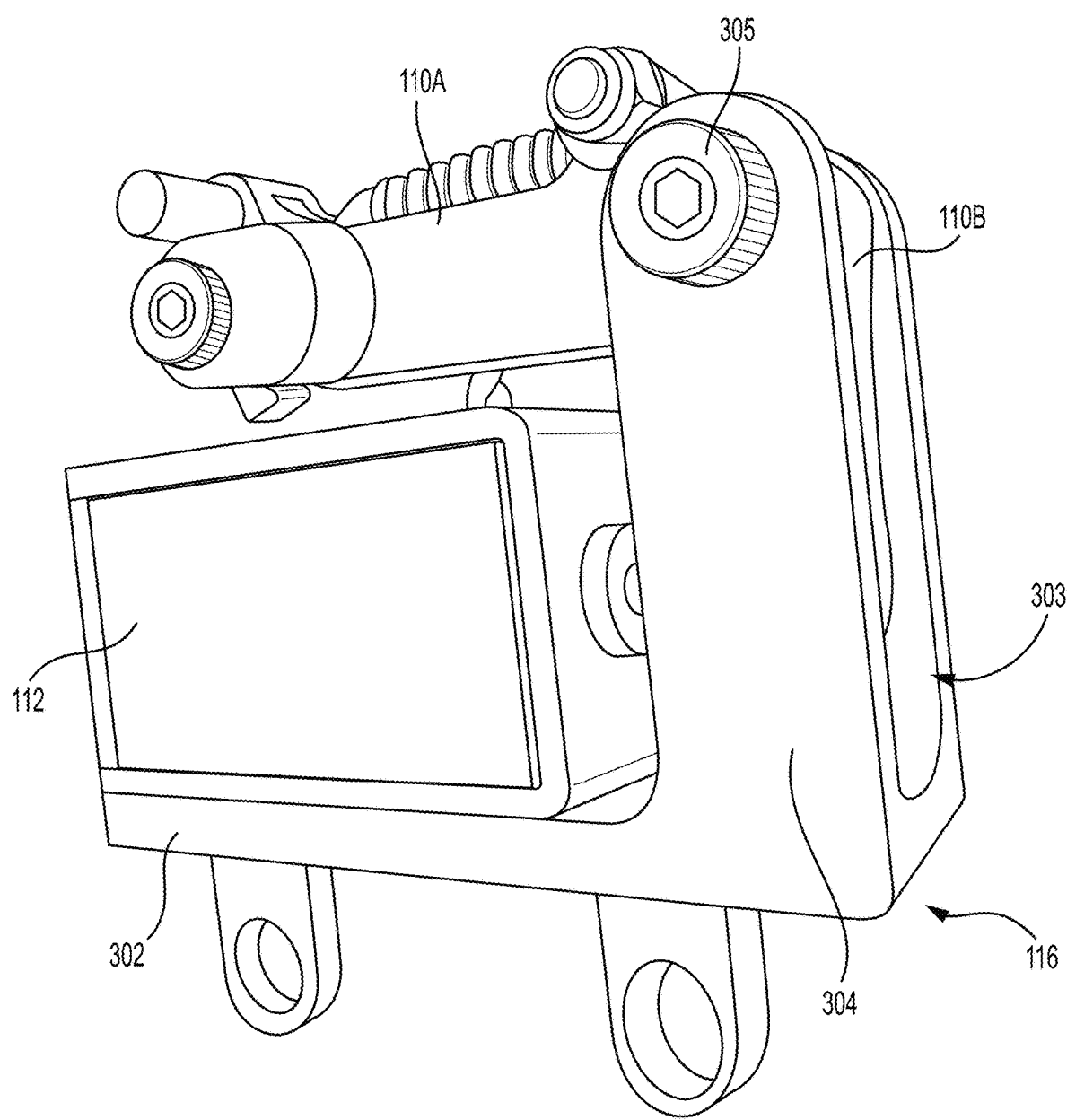
FIG. 4 is another view of the solenoid mount for the propeller locking mechanism.

FIG. 4 is another perspective view showing the solenoid mount 116. The bolt extension mount 304 has a removed center region 303 and a bolt 305 inserted through its upper end which extends across the removed center region 303 and to the opposing side of the bolt extension mount 304. A lever 110 is pivotably coupled about the bolt 305 for pivoting.

Returning to FIG. 3 the lever 110 has an "L" shape configuration with a first arm 110A shown to be protruding above the solenoid 112 and a second arm 110B perpendicular to the first arm 110A positioned within the bolt extension mount 304. On a first end of the first arm 110A, a pivot bar 109 is configured to mount and rotate freely about an axle 111 created by a securement device, which secures the pivot bar 109 to the first arm 110A. The axle 111 may be a bolt. A locking pin 106 is attached to the free end of the pivot bar 109. The locking pin 106 is sized such that it is able to insert into the aperture 118 on the locking extension 104 (shown in FIGS. 1 and 2).

Figure 5:
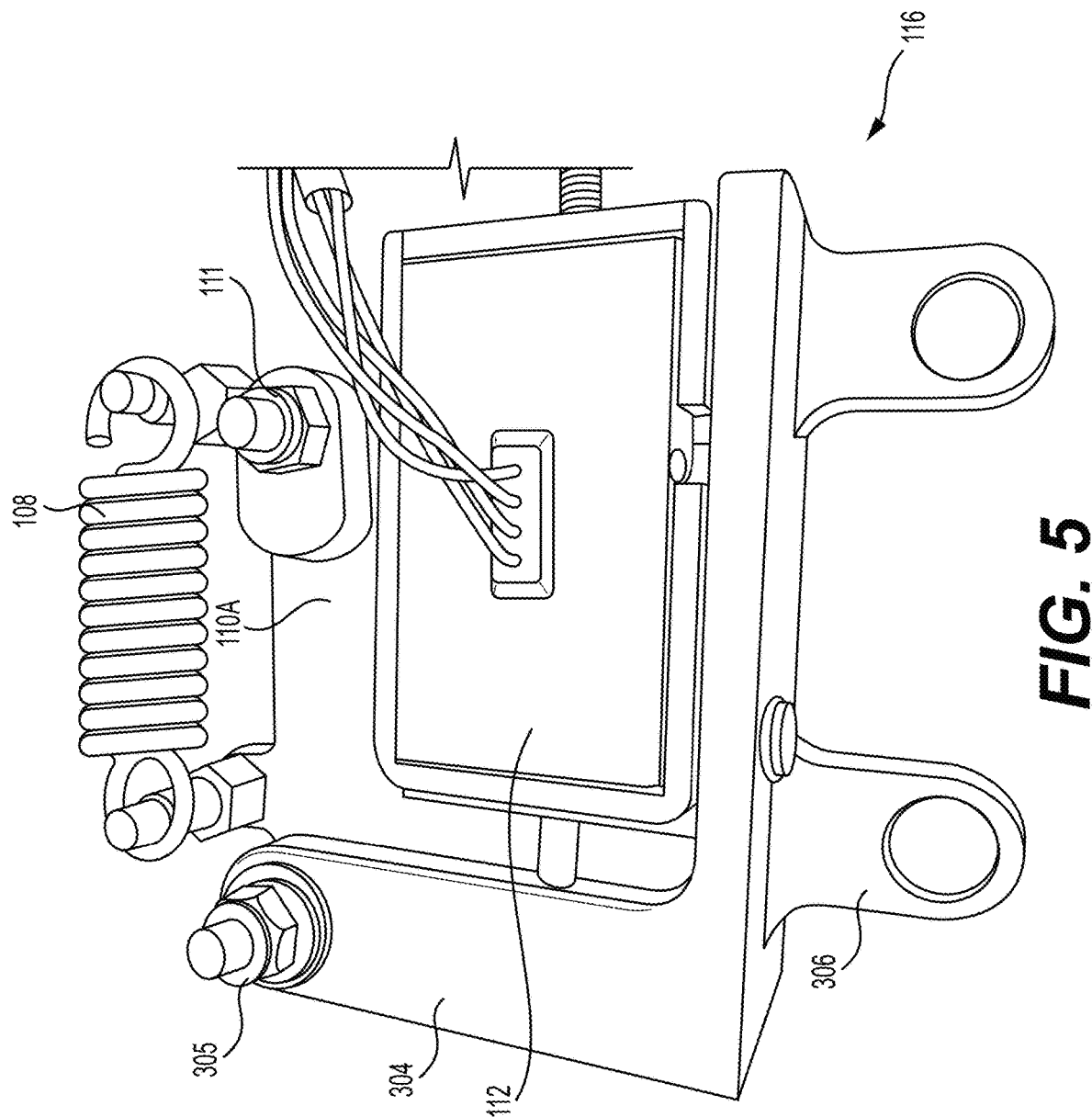
FIG. 5 is a rear view of the solenoid mount of FIG. 3 for the propeller locking mechanism.
Figure 6:
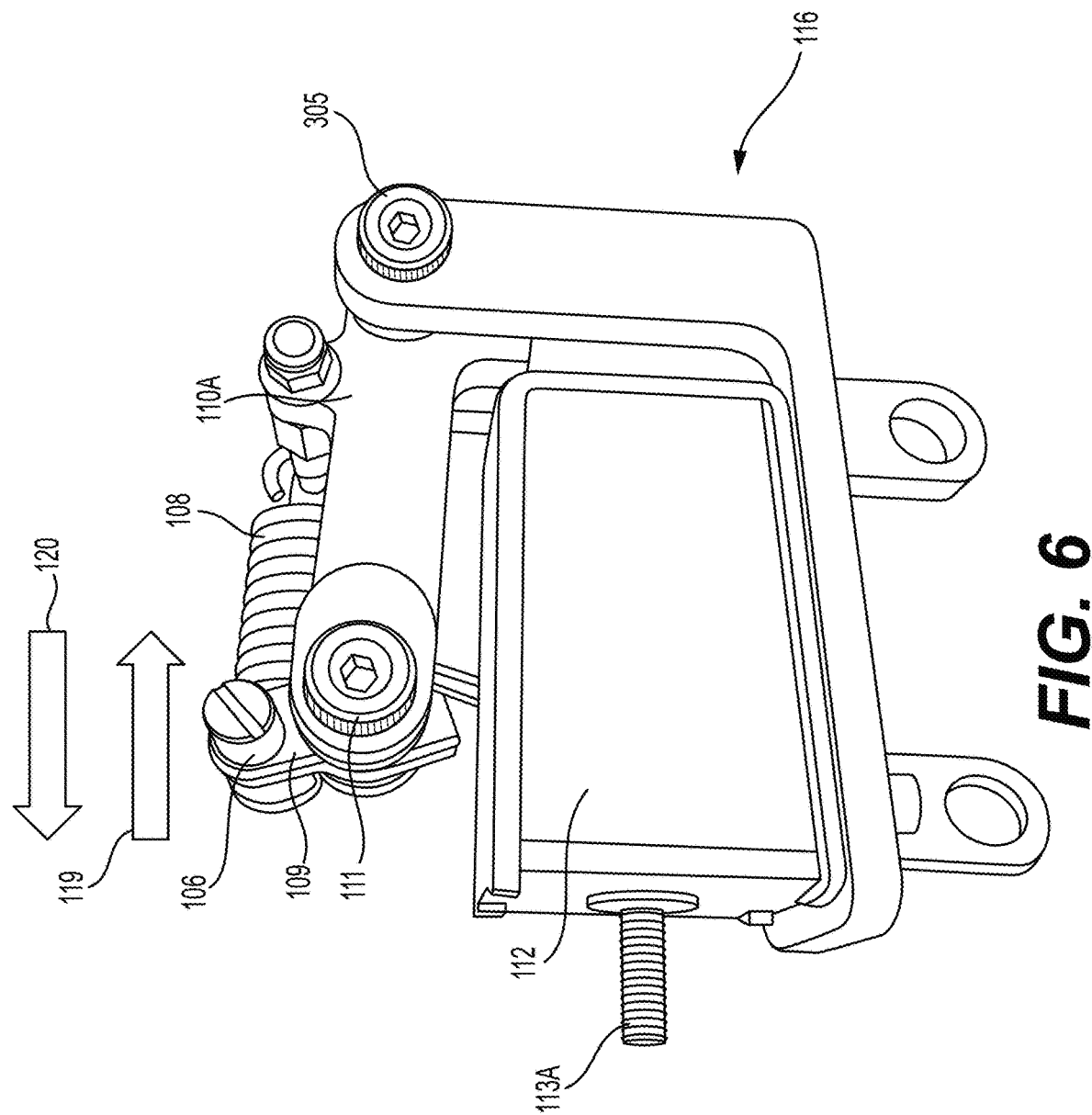
FIG. 6 is a front perspective view of the solenoid mount of FIG. 3 for the propeller locking mechanism.

FIG. 5 shows a perspective view of the opposite side of the solenoid mount 116 compared with FIGS. 3, 4, and 6. A spring 108 is attached to the first arm 110A of the lever 110. One end of the spring 108 is attached to the pivot bar 109 (FIG. 4) and the other end of the spring is mounted on the first arm 110A near the bolt extension mount 304.

FIG. 6 shows an alternate perspective view of the solenoid mount 116. The pivot bar 109 is secured to the lever 110 such that one end of the pivot bar 109 may pivot and rotate freely about the axle 111. The spring 108 is mechanically coupled to the locking pin 106. The spring 108 is configured to pull the pivot bar 109 generally in a first direction 119 as shown in FIG. 6 causing the pivot bar to rotate clockwise as shown in FIG. 6, whereas rotation of the pivot bar 109 in a second direction 120 (e.g., counter-clockwise as shown in FIG. 6) may cause extension of spring 108 in the second direction 120.

Figure 7:
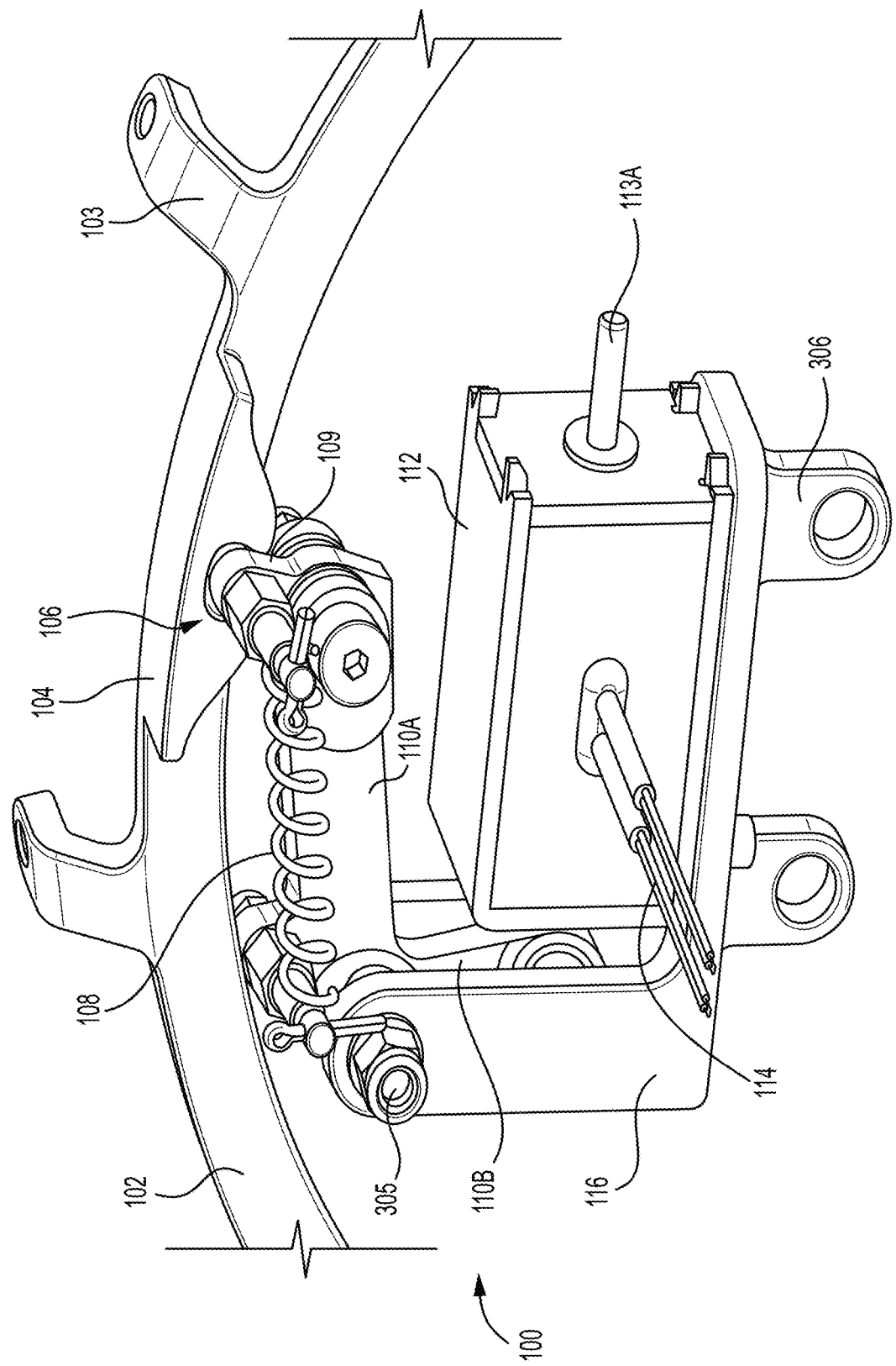
FIG. 7 is a front perspective view of the propeller locking mechanism in a locked orientation.

FIG. 7 shows a perspective view of the propeller locking mechanism 100 in a locked orientation. One end of the locking pin 106 is configured for insertion into the aperture 118 (see FIGS. 1 and 2) of the locking extension 104. The aperture 118 on the locking extension 104 is configured to engage with the locking pin 106 such that the locking pin 106 is able to slide into and out of the horseshoe-shaped opening of the aperture 118. The locked orientation is defined as the position where the locking pin 106 is inserted into the aperture 118. The first end of the spring 108 is also connected to the free end of the pivot bar 109 which is attached near an end of the first arm 110A of the lever 110. The second end of the spring 108 is mounted and attached at a fixed position on the first arm 110A of the lever 110, substantially nearer the pivot point of the lever 110. The pivot point is the position where the bolt 305 extends through the lever 110 enabling the lever 110 to rotate on the bolt 305 axis.

The solenoid 112 is able to receive power from an electrical power supply source via supply wires 114. When the solenoid 112 receives power the solenoid pin 113 is able to be spun so that the first threaded end 113A (highlighted in FIG. 7) of the solenoid pin 113 either extends further into the solenoid 112 or is retracted further out of the solenoid 112. The distance of the second end 113B of the solenoid pin 113 which protrudes from the opposing side of the solenoid 112 is dependent on whether the first end 113A of the solenoid pin 113 is spun into or out of the solenoid 112 which increases or decreases the amount of the second end 113B of the solenoid pin 113 protruding on the opposite side of the solenoid 112. For instance, if the first end 113A of the solenoid pin 113 is spun into the solenoid 112 then a greater distance of the second end 113B of the solenoid pin 113 will protrude from the opposing side of the solenoid 112. The second end 113B of the solenoid pin 113 is configured to interact with the second arm 110B of the "L" shaped lever 110. When the first end 113A of the solenoid pin 113 is spun into the solenoid 112 the second end 113B of the solenoid pin 113 pushes the second arm 110B of the lever 110. When the first end 113A of the solenoid pin 113 is spun out of the solenoid 112 the second end 113B of the solenoid pin 113 allows the second arm 110B of the lever 110 to recess. When the second arm 110B of the lever 110 is pushed or is recessed it pivots within the removed center region of the bolt extension mount 304 about the bolt 305 axis. The rotation of the lever 110 pivots allows the locking pin 106 to translate upwards or downwards. When the locking pin 106 is translated upwards the locking pin 106 may insert into the aperture 118 and be in a locked orientation as shown in FIG. 1, and when lever 110 is translated downwards the locking pin 106 may be removed from the aperture 118. The locking extension 104 inner edge curvature configuration and the open horseshoe of the aperture 118 allow the locking pin 106 to slide into the aperture 118 when translated upwards or out of the aperture 118 when translated downwards. The spring 108 attached to the first arm 110A of the lever 110 pivots in the same reference frame as the lever 110. The spring 108 is connected to the free end of the pivot bar 109 so that the spring 108 holds the pivot bar 109 in the locked position. If the spring 108 tension is overcome, the pivot bar 109 may be pivoted to assist with the locking pin 106 being removed from the aperture 118. The spring 108 tension may be overcome if the propeller motor creates sufficient propeller torque. Thus, the motor may be used to disengage the locking pin 106 from the aperture 118 by rotating mounting ring 102 and overcoming the tension in spring 108 and force the locking pin 106 out of the aperture 118. The propeller locking mechanism 100 may be implemented on motors configured to rotate a propeller either in the clockwise direction or the counterclockwise direction. A clockwise or counterclockwise propeller rotating motor may overcome the tension in the spring 108 by driving the propeller in the direction provided by the motor.

Figure 8:
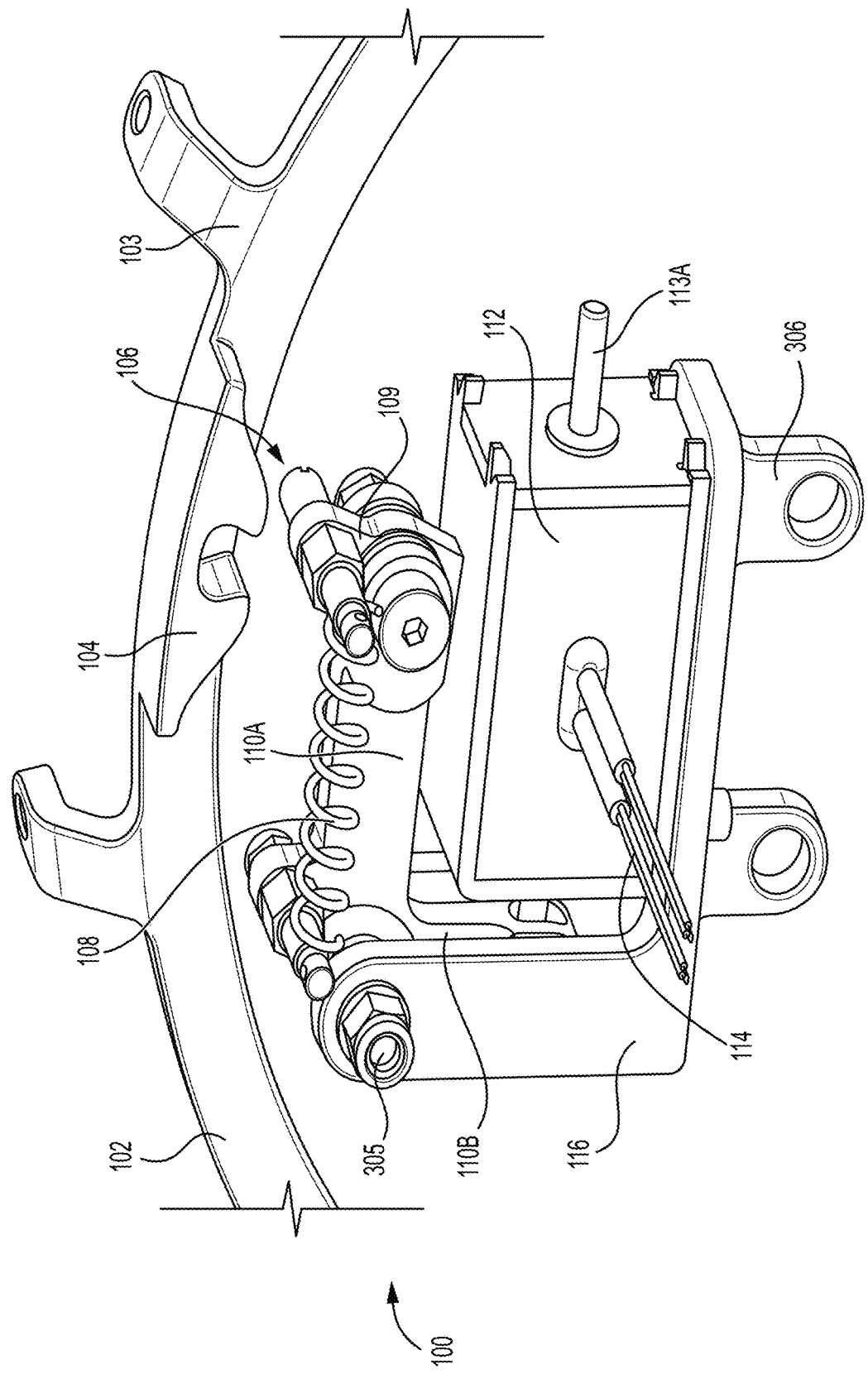
FIG. 8 is a front perspective view of the propeller locking mechanism in an unlocked orientation.

FIG. 8 shows the propeller locking mechanism 100 in an unlocked orientation. The propeller locking mechanism 100 may enter an unlocked orientation from the locked orientation when power is supplied to the solenoid 112 which rotates the first threaded end 113A of the solenoid pin 113 into the solenoid 112 and increases the distance of the second end 113B of the solenoid pin 113 which extends from the opposing end of the solenoid 112. The displacement in distance pushes the second arm 110B of the lever 110 which causes the lever 110 to rotate about the bolt 305 axis. The rotation of the lever 110 causes the locking pin 106 to shift downwards and be removed from the aperture 118. When the locking pin 106 is removed from the aperture 118 the propeller locking mechanism 100 is in an unlocked orientation as shown in FIG. 8. The propeller locking mechanism 100 may also reach an unlocked orientation in instances when power is not able to be supplied to the solenoid 112 to turn the solenoid pin 113. The aircraft motor torque may also allow the propeller locking mechanism 100 to go from a locked orientation to an unlocked orientation. The aircraft motor may overcome tension in the spring 108 holding the pivot bar 109 and locking pin 106 in position. When the propeller motor begins to rotate the propeller the spring 108 holding the locking pin 106 in place within the aperture 118 is tensioned and stretched due to the motor force produced to rotate the propeller. In embodiments, a torque of approximately 14 Nm (Newton-meters) may be required to be overcome by the aircraft motor to overcome the spring 108 tension holding the locking pin 106 within the aperture 118. In some embodiments a torque of 7 Nm to 21 Nm may be required to overcome the spring 108 tension. When the spring 108 force is exceeded by the aircraft motor, the locking pin 106 slides up a side of the horseshoe shape of the aperture 118 and is able to slide off of the locking extension 104 due to the sloping curvature and smooth profile of the inner edge of the locking extension 104. The profile and curvature of the inner edge of the locking extension 104 allow for the locking pin 106 to slide away from the horseshoe opening of the aperture 118 upon which it was inserted. The locking pin 106 is positioned away from the locking extension 104 when in an unlocked orientation such that the locking pin 106 does not interact with the mounting ring 102 when the propeller is spinning.

The propeller locking mechanism 100 may enter a locked orientation, as shown in FIG. 7, from an unlocked orientation. The solenoid 112 may receive power from the power source via supply wires 114 to rotate the first end 113A of the solenoid pin 113 out of the solenoid 112 and decrease the length of the second end 113B of the solenoid pin 113 on the opposing side of the solenoid 112. The second arm 110B of the lever 110 is then able to recess and rotate around the axis of the bolt 305. This rotation will enable the locking pin 106 to be slid up and insert into the aperture 118. The insertion of the locking pin 106 may require precise positioning and calculation of the stop point of the propeller. An algorithm with input parameters may be used to calculate the stop position of the propeller so that the propeller is stopped at the aperture 118 position on the mounting ring 102. The algorithm potentially used is not described in depth herein and should not be considered limiting within the scope of this application. When the locking pin 106 is inserted into the aperture 118 the propeller locking mechanism 100 is in a locked orientation.

FIG. 9 shows the propeller locking mechanism 100 installed onto a motor rotor 202 with a propeller 204 in an embodiment. The bolt mounts 103 wrap onto an edge of the motor rotor 202 and substantially secure the propeller locking mechanism 100 to the motor rotor 202.

Figure 10:
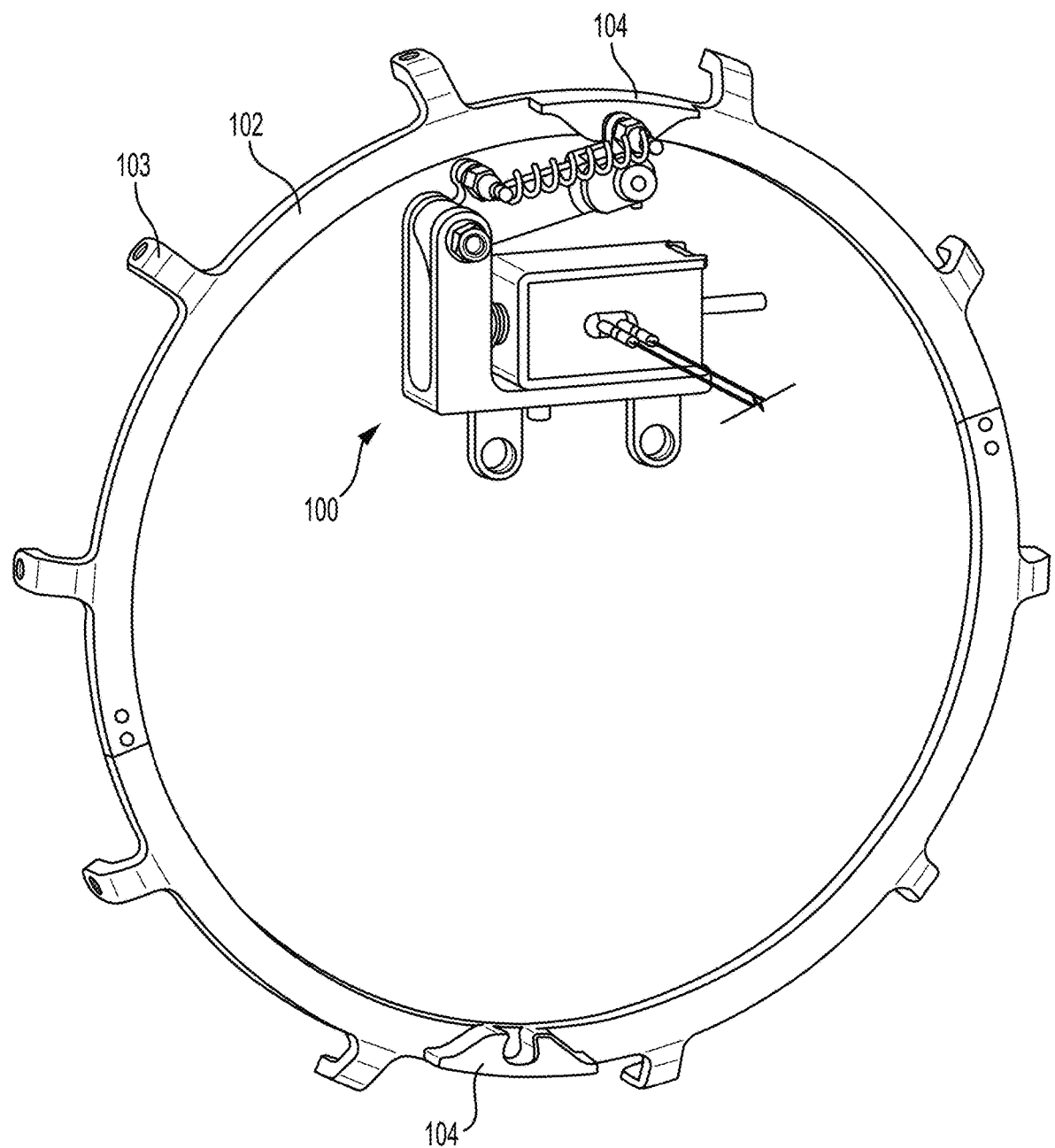
FIG. 10 is a perspective view of the propeller locking mechanism in an embodiment.

FIG. 10 shows an alternative embodiment including two locking extensions 104 positioned opposite one another on the mounting ring 102. The propeller locking mechanism 100 may include two locking extensions 104, which enables the propeller locking mechanism 100 to lock the propeller 204 more quickly due to the mounting ring 102 only being required to rotate a half rotation before the propeller locking mechanism 100 is aligned with the locking extension 104.

The propeller locking mechanism 100 may be implemented on numerous different types of propellers which should not be considered limiting within the scope of this application. A propeller on which the propeller locking mechanism 100 is implemented may be responsible for providing an aircraft with horizontal thrust or vertical thrust. The propeller locking mechanism 100 may be implemented on one propeller or numerous different propellers on a single aircraft. This propeller or propellers may be converted between horizontal and vertical orientations to provide horizontal or vertical thrust. The propeller locking mechanism 100 may enable the aircraft to lock either a horizontal or vertical thrust producing propeller or propellers in flight when either horizontal or vertical thrust is not required.

Features described above as well as those claimed below may be combined in various ways without departing from the scope hereof. The following clauses illustrate some possible, non-limiting combinations:

Clause 1. A propeller locking mechanism for an aircraft, the propeller locking mechanism comprising: a mounting ring having a locking extension, wherein the mounting ring is configured for mounting to an aircraft motor rotor; a solenoid mount mechanically coupled to an aircraft, wherein the solenoid mount comprises a solenoid and a lever operatively coupled to the solenoid, such that the solenoid is configured to pivot the lever within the solenoid mount; a locking pin pivotally coupled to a first arm of the lever, wherein the locking pin is configured for insertion into an aperture of the locking extension for locking the mounting ring; and the solenoid is configured to pivot the lever in a first direction for removal of the locking pin from the aperture for unlocking the mounting ring.

Clause 2. The propeller locking mechanism of clause 1 wherein the aperture includes a horseshoe-shaped opening and a profile which slopes away from the aperture on either side of the aperture.

Clause 3. The propeller locking mechanism of clause 1 or 2 wherein the locking pin is sized and configured to slide into and out of the horseshoe-shaped opening of the aperture for locking and unlocking the mounting ring.

Clause 4. The propeller locking mechanism of clauses 1 through 3 wherein the solenoid includes a solenoid pin configured to engage with a second arm of the lever opposite the first arm.

Clause 5. The propeller locking mechanism of clauses 1 through 4 comprising a pivot bar pivotally coupled to the first arm of the lever.

Clause 6. The propeller locking mechanism of clauses 1 through 5 comprising a spring attached to the first arm of the lever.

Clause 7. The propeller locking mechanism of clauses 1 through 6 comprising a magnet configured to interact with and hold the solenoid pin in a first position or a second position.

Clause 8. The propeller locking mechanism of clauses 1 through 7 wherein the solenoid mount is mounted onto a propeller motor holder.

Clause 9. The propeller locking mechanism of clauses 1 through 8 wherein the mounting ring is unlocked when a motor rotates the mounting ring in a clockwise direction.

Clause 10. A method for a propeller locking mechanism for an aircraft, the method comprising: engaging a locking pin in an aperture of a mounting ring for securing the locking pin to the mounting ring, wherein the mounting ring is mounted to a propeller hub and the locking pin is pivotally coupled to an aircraft via a lever; actuating the lever via a solenoid for retrieving the locking pin from the aperture thereby unlocking the mounting ring; biasing the locking pin with a spring such that upon release of the lever via the solenoid, the spring biases the locking pin into the aperture.

Clause 11. The method of clause 10 comprising rotating the mounting ring via an aircraft motor, wherein the mounting ring is configured to tension the spring and force the locking pin out of the aperture based on a predetermined torque.

Clause 12. The method of clauses 10 or 11 comprising pivoting the lever including a first arm and a second arm wherein a pivot rod is rotatably attached to the first arm and a solenoid pin is configured to engage with the second arm.

Clause 13. The method of clauses 10 through 12 comprising moving the solenoid pin to engage with the second arm of the lever.

Clause 14. The method of clauses 10 through 13 comprising holding the solenoid pin in a locked or unlocked orientation using one or more magnets.

Clause 15. The method of clauses 10 through 14 comprising unlocking the mounting ring using a motor to rotate the mounting ring in a counterclockwise direction.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A propeller locking mechanism for an aircraft, the propeller locking mechanism comprising:
   a mounting ring having a locking extension, wherein the mounting ring is configured for mounting to an aircraft motor rotor;

a solenoid mount mechanically coupled to an aircraft, wherein the solenoid mount comprises a solenoid and a lever operatively coupled to the solenoid, such that the solenoid is configured to pivot the lever within the solenoid mount;

a locking pin pivotally coupled to a first arm of the lever, wherein the locking pin is configured for insertion into an aperture of the locking extension for locking the mounting ring; and the solenoid is configured to pivot the lever in a first direction for removal of the locking pin from the aperture for unlocking the mounting ring.

2. The propeller locking mechanism of claim 1 wherein the aperture includes a horseshoe-shaped opening and a profile which slopes away from the aperture on either side of the aperture.

3. The propeller locking mechanism of claim 1 wherein the locking pin is sized and configured to slide into and out of the horseshoe-shaped opening of the aperture for locking and unlocking the mounting ring.

4. The propeller locking mechanism of claim 1 wherein the solenoid includes a solenoid pin configured to engage with a second arm of the lever opposite the first arm.

5. The propeller locking mechanism of claim 1 comprising a pivot bar pivotally coupled to the first arm of the lever.

6. The propeller locking mechanism of claim 1 comprising a spring attached to the first arm of the lever.

7. The propeller locking mechanism of claim 1 comprising a magnet configured to interact with and hold the solenoid pin in a first position or a second position.

8. The propeller locking mechanism of claim 1 wherein the solenoid mount is mounted onto a propeller motor holder.

9. The propeller locking mechanism of claim 1 wherein the mounting ring is unlocked when a motor rotates the mounting ring in a clockwise direction.

10. A method for a propeller locking mechanism for an aircraft, the method comprising:

engaging a locking pin in an aperture of a mounting ring for securing the locking pin to the mounting ring, wherein the mounting ring is mounted to a propeller hub and the locking pin is pivotally coupled to an aircraft via a lever;

actuating the lever via a solenoid for retrieving the locking pin from the aperture thereby unlocking the mounting ring;

biasing the locking pin with a spring such that upon release of the lever via the solenoid, the spring biases the locking pin into the aperture.

11. The method of claim 10 comprising rotating the mounting ring via an aircraft motor, wherein the mounting ring is configured to tension the spring and force the locking pin out of the aperture based on a predetermined torque.

12. The method of claim 10 comprising pivoting the lever including a first arm and a second arm wherein a pivot rod is rotatably attached to the first arm and a solenoid pin is configured to engage with the second arm.

13. The method of claim 10 comprising moving the solenoid pin to engage with the second arm of the lever.

14. The method of claim 10 comprising holding the solenoid pin in a locked or unlocked orientation using one or more magnets.

15. The method of claim 10 comprising unlocking the mounting ring using a motor to rotate the mounting ring in a counterclockwise direction.

\* \* \* \* \*